United States Patent [19]

Davies

[11] Patent Number: 4,657,683

[45] Date of Patent: Apr. 14, 1987

[54] BEARING MATERIAL OF POLYTETRAFLUROETHYLENE INCORPORATING A FILLER

[75] Inventor: Glyndwr J. Davies, Uxbridge, England

[73] Assignee: AEPLC, Rugby, England

[21] Appl. No.: 839,429

[22] Filed: Mar. 13, 1986

[30] Foreign Application Priority Data

Mar. 15, 1985 [GB] United Kingdom ............... 8506807

[51] Int. Cl.$^4$ ............................................. F16C 33/12
[52] U.S. Cl. ................................. 252/12; 252/12.2; 252/25; 252/26
[58] Field of Search .................... 252/12, 12.2, 25, 26

[56] References Cited

U.S. PATENT DOCUMENTS

| | | | |
|---|---|---|---|
| 4,000,982 | 1/1977 | Ueda ................................. | 252/12.2 |
| 4,312,772 | 1/1982 | Mori ................................. | 252/12.2 |
| 4,394,275 | 7/1983 | Bickle et al. ...................... | 252/12 |
| 4,501,676 | 2/1985 | Moorhouse ........................ | 252/12 |

Primary Examiner—Jacqueline V. Howard
Attorney, Agent, or Firm—Price, Heneveld, Cooper, DeWitt & Litton

[57] ABSTRACT

A cavitation erosion resistant and lubricated wear resistant plain bearing comprising a steel backing, a sintered bronze interlayer and a lining of PTFE filled with 1 to 50% by volume of a chemically stable hydroxide, preferably crystalline Al(OH).

12 Claims, No Drawings

BEARING MATERIAL OF POLYTETRAFLUROETHYLENE INCORPORATING A FILLER

BACKGROUND OF THE INVENTION

The present invention relates to plain bearings, in particular, oil-lubricated bearings where very low friction, particularly static (breakaway) friction is essential, such as for automotive shock absorbers of the McPherson strut type.

Because of the requirement for very low friction, in these situations, in general only bearing materials with a very high proportion of Polytetrafluroethylene (PTFE) in the sliding surface are suitable since no materail other than PTFE appears to be able to achieve the low friction levels required. However, PTFE alone is very soft and weak and has an unacceptably high wear rate, thus harder materials must be added to the PTFE bearing surface to reduce wear and give an acceptable bearing life.

Bearings currently used in these applications consist of a steel backing having a porous bronze sinter layer and a bearing layer comprising filled PTFE. The bearing layer fills the intersticies of the sinter and forms a thin layer (approx. 25 microns) above the sinter. Some known compositions consist of PTFE filled with either 20% by volume of lead, molybdenum disulphide, graphite, bronze, etc.

These conventional materials tend to suffer erosion effects when used under severe conditions in which cavitaion occurs in the lubricating oil. Such conditions can occur at high conterface velocities in such applications as gear pumps and aviation fuel pumps, and automotive shock absorbers where the rod speed relative to the bearing surface moves at abnormally high speeds (greater than 3 m/sec.). This form of cavitation erosion results in the removal of the filled PTFE phase from the sinter by the actioin of the lubricating oil alone, without rubbing wear.

SUMMARY OF THE INVENTION

It is an object of the present invention to provide a plain bearing having a filled PTFE layer which shows greater cavitation erosion resistance than the conventional materials.

It is a further object of the invention to provide such a bearing having an improved lubricated wear resistance over the conventional materials.

According to the invention there is provided a plain bearing comprising a metal backing, a sinter layer on the backing and a bearing layer on the sinter, the bearing layer comprising PTFE and a hydroxide additive containing hydroxide ions or hydroxyl groups, which additive is chemically stable under normal PTFE processing conditions.

The preferred additive material is crystalline Al(OH)$_3$ which is not the same material as amorphous ionic Al(OH)$_3$ produced for example by precipitation of a soluble aluminium salt with an alkali. The latter amorphous ionic material is soluble in both acids and alkalis and also is substantially dehydrated to alumina at normal PTFE processing temperatures. Crystalline Al(OH)$_3$ is inert to both acids and alkalis and loses water only slowly during sintering of the PTFE matrix, leaving residual hydroxide groups in the finished material.

All known PTFE fillers produce a negative reinforcing effect i.e. the filled material is weaker than unfilled PTFE. This is because of the unusually low interactions between PTFE and other materials. The free surface energy of PTFE is very low with no normal chemically active sites on the molecule. This, together with the stiff, smooth molecular profile, makes PTFE very resistant to wetting or bonding to most materials. However, there is one chemical interaction available to the sheath of flourine atoms surrounding the PTFE molecule, that via hydrogen bonding. A hydrogen bond can occur between a flourine atom and a hydrogen atom which is itself bonded to another very electronegative atom such as oxygen or nitrogen in this case, the hydrogen bonded to the oxygen in the hydroxyl group of Al(OH)$_3$.

A composition for the bearing material in accordance with the invention tends to show not only very much enhanced cavitation erosion-resistance while retaining desirable friction properties, but also a significant improvement in lubricated wear resistance.

Preferably, the backing is of steel and the sinter layer is preferably of tin-bronze or leaded-bronze. The hydroxide is preferably in a finely-divided form within the PTFE phase, having a particle size range of 0.01 to 10 microns, preferably 0.1 to 1 micron.

The hydroxide may be present in an amount of 1 to 50% by volume, preferably 10 to 30% by volume for example 20% by volume. The solubitity of the hydroxide in water is preferably below 0.05 g per 100 cm$^3$ at 18° C. The adverse effect of water solubility may be associated with the method of incorporation to the filler into the PTFE, which is carried out in aqueous suspension using an aqueous dispersion of PTFE.

The bearing material may also incorporate metallic lead, though preferably, the combined amount of hydroxide and lead should not exceed 50% by volume.

The invention also extends to the bearing material composition per se, as described above.

DESCRIPTION OF PREFERRED EMBODIMENT

The invention may be carried into practice in various ways and some embodiments will now be illustrated in the following test rsults.

Filled PTFE mouldings were made by conventional techniques and tested on an Instron test machine at a pulling rate of 2 cm/min. Table 1 below presents average results.

TABLE 1

| Filler Material | Tensile Strength (Moulded) psi |
| --- | --- |
| Unfilled PTFE | 3000–5000 |
| 20% vol Crystalline Al(OH)$_3$ | 4500 |
| 20% vol Glass Fibre | 1800–3000 |
| 20% vol Bronze | 1500–2000 |
| 20% vol Carbon Fibre | 2000 |
| 20% vol Powdered Coke | 2000 |
| 20% vol Mica | 2900 |
| 20% vol Graphite | 2300 |
| 20% vol MoS$_2$ | 1800 |

As can be seen, the tensile strength of the 20% Al$_2$(OH)$_3$ filled PTFE is higher than other known filled compositions and is comparable with that of unfilled PTFE.

Steel backed bronze sinter was impregnated and coated with the new composition by the conventional technique, and tested along with similar specimens of conventional strut bearing materials.

Table 2 shows the results of tests comparing the lubricated wear resistance of the bearing material in accordance with the invention, with that of conventional strut bearing materials.

TABLE 2
Results of 20 hr lubricated thrust washer wear test.

| FILLER MATERIAL | MEAN WEAR ($\mu$m) 100 Kg/cm$^2$ LOAD | WEAR ($\mu$m) MEAN 500 Kg/cm$^2$ LOAD |
|---|---|---|
| Unfilled PTFE | 25 | >30 |
| 20% Vol Crystalline Al(OH)$_3$ | <1 | 5 |
| 20% Vol Lead | 5 | 20 |
| 20% Vol MoS$_2$ | 20 | >30 |

Table 3 shows the results of tests comparing ultrasonic cavitation erosion of the bearing material in accordance with the invention, with that of conventional strut bearing materials.

TABLE 3
Results of Ultrasonic cavitation erosion test.

| FILLER MATERIAL | (15 Min Erosion time) Mean vol loss × 10$^{-3}$ cm$^3$ | (45 Min Erosion Time) |
|---|---|---|
| 20% Vol Crystalline Al(OH)$_3$ | <0.05 | 0.02 |
| 20% Vol Lead | 3.8 | 8.1 |
| 20% Vol MoS$_2$ | 8.5 | 15.2 |

As can be seen from tables 2 and 3, in wear and cavitation erosion conditions the performances of the material in accordance with the invention was superior to known materials.

Obviously, numerous modifications and variations of the present invention are possible in the light of the above teachings. It is therefore to be understood that within the scope of the appended claims, the invention may be practiced otherwise than as specifically described herein.

What is claimed is:

1. A bearing material comprising polytetrafluroethylene intimately admixed with 1 to 50 percent by volume of a hydroxide additive containing hydroxide ions or hydroxyl groups said additive being chemically stable under normal polytetrafluroethylene processing conditions.

2. A material according to claim 1 wherein said hydroxide is crystalline aluminium tri-hydroxide (Al(OH)$_3$).

3. A material according to claim 1, wherein said hydroxide is present in a finely divided form in said polytetrafluoroethylene, the particle size of said hydroxide being in the range of 0.01 to 10 microns.

4. A material according to claim 1 further incorporating metallic lead.

5. A plain bearing comprising a metal backing, a sinter layer on said backing and a bearing layer on said sinter, said bearing layer comprising polytetrafluroethylene intimately admixed with one to 50 percent by volume of a hydroxide additive contain hydroxide ions or hydroxyl groups said additive being chemically stable under normal polytetrafluroethylene processing conditions.

6. A bearing according to claim 5 wherein said backing is of steel.

7. A bearing according to claim 5 wherein said sinter layer is sintered bronze.

8. A bearing according to claim 5 wherein said hydroxide is crystalline aluminium tri-hydroxide (Al(OH)$_3$).

9. A bearing according to claim 5 wherein said hydroxide is present in a finely divided form in said polytetrafluroethylene, the particle size of said hydroxide being in the range of 0.01 to 10 microns.

10. A bearing according to claim 5 further incorporating metallic lead.

11. A bearing material comprising polytetrafluroethylene intimately admixed with about 20% by volume of hydroxide additive containing hydroxide ions or hydroxyl groups said additive being chemically stable under normal polytetrafluroethylene processing conditions.

12. A bearing material comprising polytetrafluroethylene intimately admixed with about 20% by volume of crystalline aluminum tri-hydroxide.

* * * * *

UNITED STATES PATENT AND TRADEMARK OFFICE
CERTIFICATE OF CORRECTION

PATENT NO. : 4,657,683

DATED : April 14, 1987

INVENTOR(S) : Glyndwr J. Davies

It is certified that error appears in the above-identified patent and that said Letters Patent is hereby corrected as shown below:

Column 1, line 15:
"materail" should be --material--.
Column 1, line 32:
"cavitaion" should be --cavitation--.
Column 1, line 39:
"actionin" should be --action--.
Column 2, line 26:
"solubitity" should be --solubility--.
Column 2, line 41:
"rsults" should be --results--.
Column 2, lines 59 and 60:
"$Al_2(OH)_3$" should be --$Al(OH)_3$--.

Signed and Sealed this

Twenty-ninth Day of September, 1987

Attest:

DONALD J. QUIGG

Attesting Officer     Commissioner of Patents and Trademarks